(12) United States Patent
Leow et al.

(10) Patent No.: US 7,446,803 B2
(45) Date of Patent: Nov. 4, 2008

(54) SYNCHRONOUS VIDEO AND DATA ANNOTATIONS

(75) Inventors: Woei Ling Leow, Singapore (SG); Hai Seng Michael Liew, Singapore (SG); Minope Tham, Singapore (SG); Kevin Ng, Singapore (SG)

(73) Assignee: Honeywell International Inc., Morristown, NJ (US)

( * ) Notice: Subject to any disclaimer, the term of this patent is extended or adjusted under 35 U.S.C. 154(b) by 718 days.

(21) Appl. No.: 10/736,113

(22) Filed: Dec. 15, 2003

(65) Prior Publication Data

US 2005/0128318 A1 Jun. 16, 2005

(51) Int. Cl.
- H04N 5/76 (2006.01)
- H04N 7/18 (2006.01)
- H04N 9/47 (2006.01)

(52) U.S. Cl. ............... 348/231.5; 348/143; 348/231.99; 348/231.3

(58) Field of Classification Search ................. 348/153, 348/211.3, 231.2, 231.3, 231.5, 231.99
See application file for complete search history.

(56) References Cited

U.S. PATENT DOCUMENTS

| | | | | |
|---|---|---|---|---|
| 5,526,133 A | * | 6/1996 | Paff | .......................... 386/117 |
| 5,857,044 A | * | 1/1999 | Ogawa et al. | .................. 386/62 |
| 5,969,755 A | * | 10/1999 | Courtney | ..................... 348/143 |
| 6,330,025 B1 | * | 12/2001 | Arazi et al. | ................... 348/143 |
| 6,628,323 B1 | * | 9/2003 | Wegmann | .................... 348/143 |
| 6,987,451 B2 | * | 1/2006 | McKeown et al. | .......... 340/541 |
| 2002/0126758 A1 | * | 9/2002 | Blanchard | .............. 375/240.13 |
| 2003/0025599 A1 | * | 2/2003 | Monroe | ...................... 340/531 |
| 2003/0228128 A1 | * | 12/2003 | Taylor et al. | .................. 386/46 |

FOREIGN PATENT DOCUMENTS

| | | |
|---|---|---|
| WO | WO 01/13637 A1 * | 2/2001 |
| WO | WO 02/082275 | 10/2002 |
| WO | WO 02/082275 A1 * | 10/2002 |

* cited by examiner

*Primary Examiner*—David Ometz
*Assistant Examiner*—Wanda M Negron
(74) *Attorney, Agent, or Firm*—Kris T. Fredrick

(57) ABSTRACT

A video surveillance system captures video of a protected area, stores the video in a computer readable memory, stores data annotations in the computer readable memory where the data annotations are searchable using a search criteria, and stores links that link the stored data annotations to corresponding video segments of the stored video so that the data annotations can be used to search for a video segment of interest. The data annotations are searched using the search criteria, and the video segment of interest linked to the data annotation found as a result of the search is displayed.

33 Claims, 3 Drawing Sheets

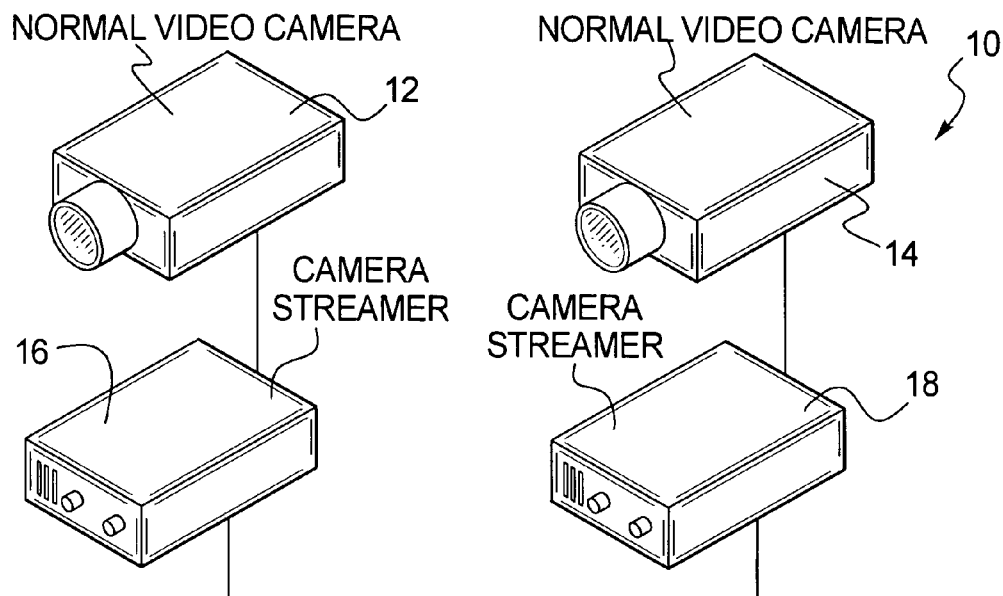
*FIG. 1*
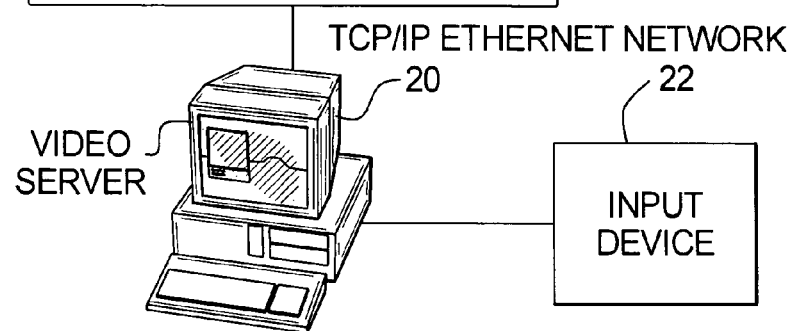
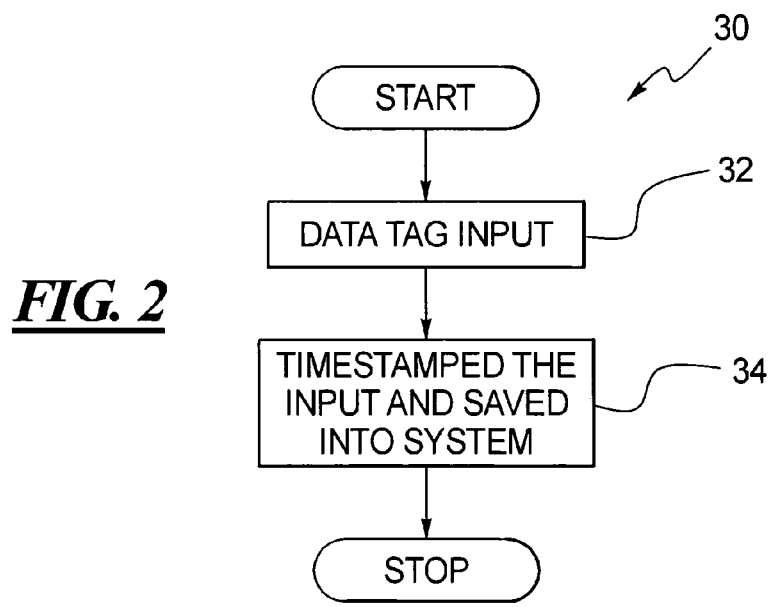
*FIG. 2*

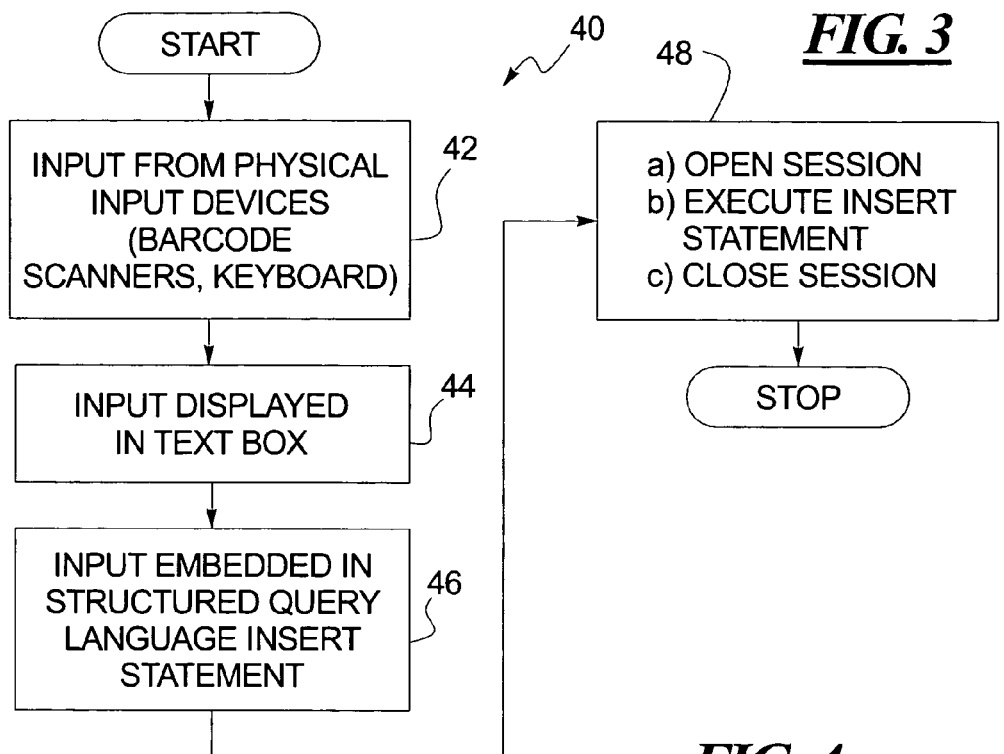
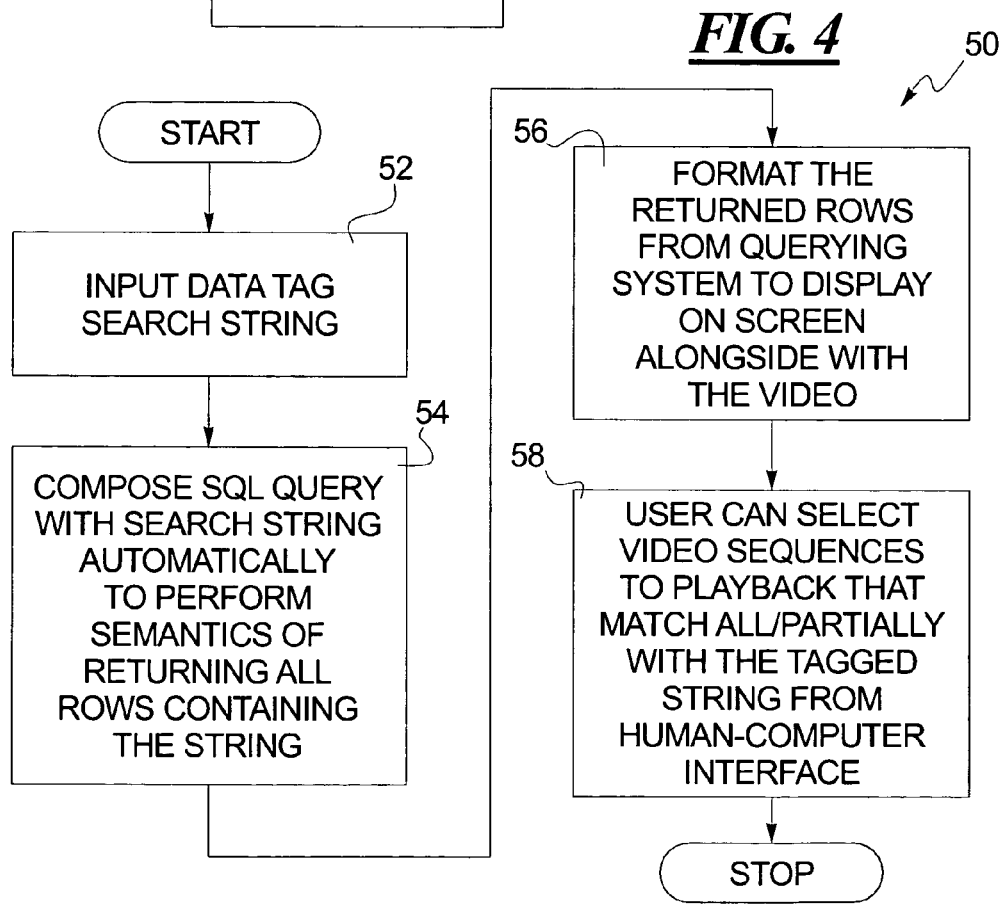

SYNCHRONOUS VIDEO AND DATA ANNOTATIONS

TECHNICAL FIELD OF THE INVENTION

The present invention relates to synchronous annotation of data to video, such as surveillance video taken of a secured area.

BACKGROUND OF THE INVENTION

Video surveillance systems are currently used to video record areas requiring protection from intruders, unauthorized use, criminal activities, etc. When an improper activity occurs in the protected area, investigators can view the video recording of the protected area in order to develop evidence useful in detecting and/or successfully prosecuting those who engaged in the improper activity.

However, finding a segment of the surveillance video that relates to the improper activity is laborious and time consuming. The video recordings acquired by current video surveillance systems contain only images captured by video cameras. Therefore, all or a substantial part of the surveillance video must be viewed in order to find the relevant segment. Current video surveillance systems do not also record or otherwise capture data annotations from other sources of information that would make it easier to find relevant video segments. Hence, when current video recordings are searched during an investigation, current video search methods rely only on temporal data and visual cognition of the viewer, which makes searches laborious, time consuming, and sometimes ineffective.

The present invention involves annotating video recordings with data from other sources. Such data annotations are synchronized or linked to the video recordings and can enable a user to more easily locate video segments of interest.

SUMMARY OF THE INVESTIGATION

In accordance with one aspect of the present invention, a surveillance system comprises a camera, an input device, and a server. The camera is arranged to output images of a protected area. The input device is arranged to provide a data annotation. The server is arranged to synchronously store the images and the data annotation so that the data annotation can be used to search for a segment of the images.

In accordance with another aspect of the present invention, a method comprises the following: storing surveillance video in a memory; storing data annotations in the memory, wherein the data annotations are useful in searching for a video segment of the surveillance video of interest; and, synchronizing the stored data annotations to the corresponding video segments of the stored video so that the data annotations can be used to search for the video segment of interest.

In accordance with still another aspect of the present invention, a surveillance method comprises the following: capturing images of a protected area; storing the images in a computer readable memory; storing data annotations in the computer readable memory, wherein the data annotations are searchable using a search criteria; and, storing a link that links the stored data annotations to corresponding image segments of the stored images so that the data annotations can be used to search for an image segment of interest.

BRIEF DESCRIPTION OF THE DRAWINGS

The features and advantages of the present invention will become more apparent from a detailed consideration of the invention taken in conjunction with the drawings in which:

FIG. 1 illustrates a video/data surveillance system according to an embodiment of the present invention;

FIG. 2 illustrates a flow chart for a data tag recording program executed by the video server of the video/data surveillance system shown in FIG. 1;

FIG. 3 illustrates a flow chart for an SQL data manipulation program executed by the video server of the video/data surveillance system shown in FIG. 1;

FIG. 4 illustrates a flow chart for a data searching program executed by the video server of the video/data surveillance system shown in FIG. 1; and, FIG. 5 illustrates a flow chart for a playback program executed by the video server of the video/data surveillance system shown in FIG. 1.

DETAILED DESCRIPTION

Figure 5:
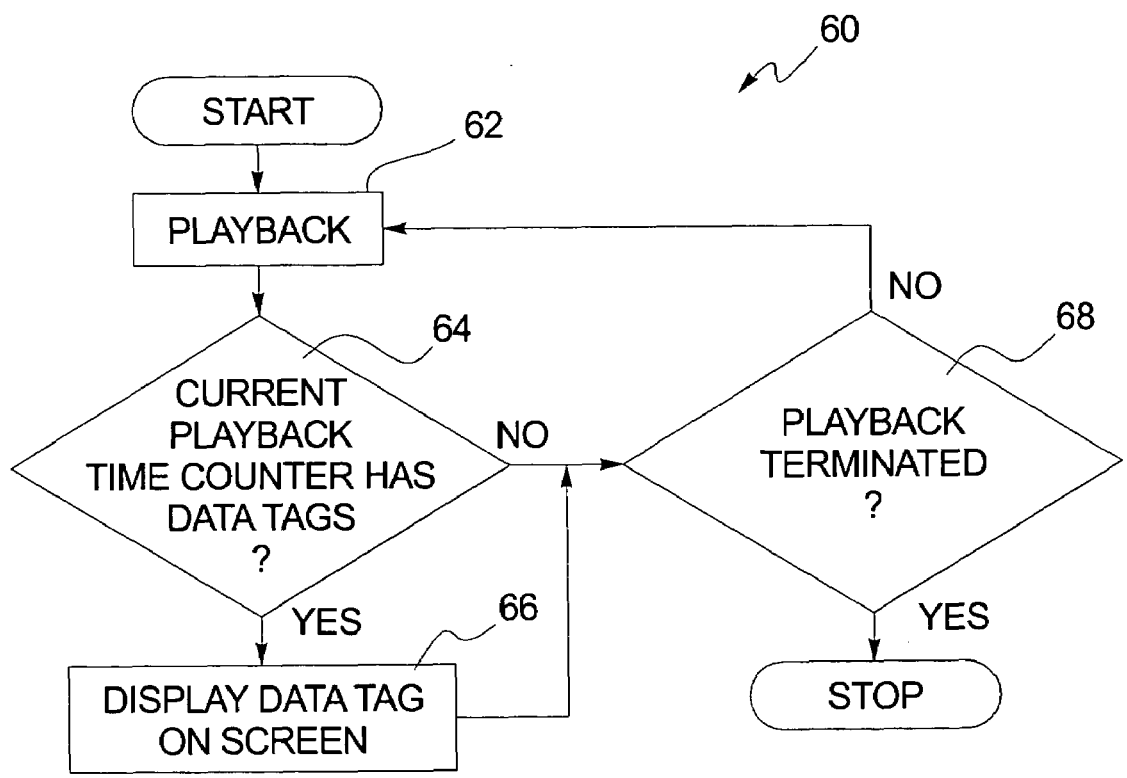

FIG. 1 illustrates a video/data surveillance system 10 that includes one or more video cameras such as video cameras 12 and 14 that are positioned so that they can capture video of one or more protected areas. Cameras other than video cameras can be used for the video cameras 12 and 14. For example, thermal imagers, IR cameras, etc. could be used. Moreover, the video cameras 12 and 14 may comprise any mix of video cameras, thermal imagers, IR cameras, etc. such as a video camera and a thermal imager, an IR camera and a thermal imager, a video camera and an IR camera, etc. The video cameras 12 and 14 feed video to corresponding camera streamers 16 and 18. The camera streamers 16 and 18 compress and otherwise format the video from the video cameras 12 and 14 for efficient storing and processing by a video server 20 coupled to the camera streamers 16 and 18. Such compression and formatting saves bandwidth and storage space.

The video server 20 stores the video streams on a suitable storage medium, and permits the stored video recordings to be viewed (as shown in FIG. 1) and searched by an investigator or other user during an investigation or otherwise. The camera streamers 16 and 18 and the video server 20 may be camera streamers provided by Axis Communications, and the video server 20 may be a standard desktop server provided by Dell. However, it should be understood that other camera streamers and/or video servers can be used instead. Also, the functions of the camera streamers 16 and 18 and of the video server 20 can be combined into a single device or divided between multiple devices.

The video/data surveillance system 10 also includes an input device 22 such as a barcode scanner, a keyboard having one or more keys, an audio device that may or may not convert voice to text, etc. If a keyboard is used as the input device 22, a QWERTY keyboard typically used with typewriters or computers may be used. One or more such devices can be used as the input device 22. The input device 22 can be hardwired to the video server 20, or the input device 22 may include a transmitter to transmit data annotations to the video server 20 by way of RF, infrared, sonic, or other signals. The input device 22 can additionally or alternatively by a device that provides biometrics signatures such as from fingerprinting, facial recognition, retina scans, etc.

The input device 22 may be used by a person such as a security guard or a foot patrol to annotate the video being recorded and stored in the video server 20. For example, such a person may enter data indicating that conditions are normal, or the person may enter data indicating an abnormality such as an explosion, a robbery, a broken window or door, an intruder, a suspicious activity, etc. The video server 20 includes software components that cause the data input by the input device 20 to be synchronously annotated to the video being recorded from the cameras 12 and 14. The annotated data is useful in facilitating a search for a video segment of interest. For example, the annotated data can help an investigator to locate video segments that recorded abnormalities.

The video server 20 is programmed with software components so that data annotations, which may be referred to alternatively as data tags and which are entered by use of the input device 22, can be stored in the memory of the video server 22 in a format that permits the data tags to be searched. For example, the data tags may be stored in SQL readable form. Thus the software components permit the data tags to be searched so that the annotated video segments can be more easily located and played back to a user. The memory of the video server 22 can be disk storage, RAM, EPROM, etc.

These software components includes a data tag recording program 30 shown by way of a flow chart in FIG. 2. A block 32 of the data tag recording program 30 receives the data tag input from the input device 22. A block 34 of the data tag recording program 30 then time stamps the received data tag with the time that the video server 20 receives the data from the input device 22 and saves both the data tag and its time stamp in memory of the video server 20. This time stamp synchronizes the data tag with the corresponding (i.e., annotated) video segment of the video also saved in the memory of the video server 20. Preferably, but not necessarily, the time stamp of the data tag and the video count associated with the video recording are in the same format.

When the data tag is stored in memory of the video server 20, an SQL program 40 is executed as shown by the flow chart of FIG. 3 so as to convert the data tag into SQL readable form. Accordingly, a block 42 of the SQL program 40 receives the data tag to be stored, and a block 44 displays the data tag in an input text box. This input text box may be a standard text input box that is used by Internet search engines to input text to be searched. However, the input text box may take other forms. A block 46 also embeds the data tag into an SQL insert statement. To then save the data tag into a database searchable in SQL, a block 48 executes the SQL insert statement by opening a session, executing the insert statement, and closing the session.

When a user wishes to find and view a particular segment of video, a data searching program 50 shown by way of a flow chart in FIG. 4 is executed by the video server 20. A block 52 receives an input data tag search string drafted by the user. This search string contains keywords or other search criteria useful in finding a relevant data tag. A block 54 automatically composes an SQL query based on the data tag search string. The search using this SQL query returns all rows of the SQL database containing the search string. These rows include the data annotations found as a result of the search. A block 56 formats the returned row(s) so as to display on the monitor of the video server 20 the formatted returned row(s) alongside the corresponding video. This display thus includes the formatted returned row(s) and the video count that corresponds to the data tag and that designates the annotated video segment. Alternatively or additionally, it is also possible to view the video directly from the time given in the time-stamp of the tagged data. A block 58 permits the user to select the video sequences for playback that match all or some of the tagged string by use of the graphical user interface.

A playback program 60 shown by way of a flow chart in FIG. 5 is executed by the video server 20 so as to play back the selected video. A block 62 begins the playback of the selected video for display on the monitor of the video server 20. A block 64 determines whether the current playback time counter has data tags. The playback time counter may be simply one or more times. A playback time counter having data tags means that there is at least a row of data linking time and data tags. The decision made by the block 64 is to check if, at the current playback time, there is/are corresponding data tag(s) stored in memory. That is, the block 64 determines whether the time indicated by the current playback time counter associated with the video matches the time stamps of the data tags. If the current playback time counter has data tags, then a block 66 causes the data tags to be also displayed on the monitor of the video server 20. If the current playback time counter does not have data tags, a block 68 determines whether the user has terminated the playback. If the block 68 determines that the user has not terminated the playback, playback of the video segments continues. On the other hand, if the block 68 determines that the user has terminated the playback, playback is stopped.

A digital video management system providing an exemplary environment for the present invention is disclosed in WO 01/13637 A1.

Certain modifications of the present invention have been discussed above. Other modifications will occur to those practicing in the art of the present invention. For example, video and data tags are displayed on the monitor of the video server 20. However, video and/or data tags can be displayed by use of devices other than the monitor of the video server 20. For example, the video server 20 can send the video and/or data tags to other monitors, to projection screens, etc.

Also, as disclosed above, a time stamp is used to link a data tag with the video that the data tag annotates. Accordingly, the data tags can be searched for a specific data tag to more easily find a video segment of interest that is linked to that specific data tag, and the time stamps of data tags found from the search can be compared to the video count of the video to identify the video segment of interest. However, links other than data tags can be used to associate data tags with their corresponding segments of video. For example, flags or pointers can be used to link data tags to their corresponding video segments. Also, links such as temperature stamps or luminosity stamps could be used. For temperature stamps, for example, thermal video of an equipment that has exceeded certain temperatures could be retrieved. For luminosity stamps, for example, video images of a certain lighting conditions could be retrieved.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A surveillance system comprising:
   a camera arranged to output images of a protected area;
   an input device arranged to provide a data annotation; and
   a server arranged to synchronously store the images and the data annotation so that the data annotation can be used to search for a segment of the images;
   wherein the server is arranged to time stamp the data annotation; and further
   wherein the server is arranged to directly compare the time stamp of the data annotation to an image count when searching for the segment of the images.

2. The surveillance system of claim 1 wherein the server is arranged to cause the segment of the images matching the time stamp to be displayed.

3. The surveillance system of claim 1 wherein the camera comprises a video camera, and wherein the server comprises a video server.

4. The surveillance system of claim 1 wherein the camera comprises an IR camera.

5. The surveillance system of claim 1 wherein the camera comprises a thermal imager.

6. The surveillance system of claim 1 wherein the server is arranged to save the data annotation in SQL readable form.

7. The surveillance system of claim 6 wherein the server is arranged to time stamp the data annotation.

8. The surveillance system of claim 7 wherein the server is arranged to match the time stamp of the data annotation to an image count when searching for the segment of the images.

9. The surveillance system of claim 6 wherein the server is arranged to receive an SQL search string corresponding to the data annotation to be searched and to search for the data annotation based on the SQL search string.

10. The surveillance system of claim 9 wherein the server is arranged to match the data annotation found as a result of the search to the segment of the images.

11. A method comprising:
storing surveillance video in a memory;
storing data annotations in the memory, wherein the data annotations are useful in searching for a video segment of the surveillance video of interest; and,
synchronizing the stored data annotations to the corresponding video segments of the stored video so that the data annotations can be used to search for the video segment of interest;
wherein the data annotations include a time stamp; and further comprising directly comparing the time stamp of the data annotations to an image count when searching for the segment of the images.

12. The method of claim 11 further comprising searching for a particular data annotation.

13. The method of claim 12 further comprising comparing the time stamp of the particular data annotation to a timing of the video when searching for the video segment of interest.

14. The method of claim 13 further comprising displaying the video segment of interest that matches the time stamp of the particular data annotation.

15. The method of claim 11 further comprising searching the data annotations using a search criteria.

16. The method of claim 15 wherein the synchronizing of the stored data annotations to the corresponding video segments comprises time stamping the data annotations with corresponding time stamps.

17. The method of claim 16 further comprising searching for a particular data annotation.

18. The method of claim 17 wherein the searching includes matching the time stamp of the particular data annotation to a timing of the video.

19. The method of claim 18 further comprising displaying the video segment of interest that matches the time stamp of the particular data annotation.

20. The method of claim 15 wherein the searching of the data comprises using SQL to conduct the search.

21. The method of claim 20 wherein the synchronizing of the stored data annotations to the corresponding video segments of the stored video comprises time stamping the data annotations with corresponding time stamps, wherein the searching comprises matching the time stamp associated with the stored data annotation that corresponds to the search criteria to a timing of the video, and wherein the method further comprises displaying the video segment of interest whose timing matches the time stamp associated with the stored data annotation that corresponds to the search criteria.

22. A surveillance method comprising:
capturing images of a protected area;
storing the images in a computer readable memory;
storing data annotations in the computer readable memory, wherein the data annotations are searchable using a search criteria; and,
storing a link that links the stored data annotations to corresponding image segments of the stored images so that the data annotations can be used to search for an image segment of interest;
wherein the data annotations include a time stamp; and further comprising directly comparing the time stamp of the data annotations to an image count when searching for the segment of the images.

23. The surveillance method of claim 22 further comprising searching for a particular data annotation using the search criteria.

24. The surveillance method of claim 23 further comprising displaying the image segment of interest linked to the particular data annotation found as a result of the search.

25. The surveillance method of claim 22 further comprising searching for a particular data annotation using the search criteria.

26. The surveillance method of claim 25 further comprising comparing the time stamp corresponding to the particular data annotation found as a result of the search to a timing of the images when searching for the image segment of interest.

27. The surveillance method of claim 26 further comprising displaying the image segment of interest whose timing matches the time stamp of the particular data annotation.

28. The surveillance method of claim 22 wherein the search criteria comprises an SQL search criteria.

29. The surveillance method of claim 28 further comprising:
searching for a particular data annotation using the SQL search criteria;
finding the image segment of interest linked to the particular data annotation; and,
displaying the image segment of interest.

30. The surveillance method of claim 22 wherein the link comprises a data attribute stamp, and wherein the data attribute serves as an index to retrieve video and data segments of the same characteristic inferred by the data attribute.

31. The surveillance method of claim 30 wherein the data attribute comprises temperature.

32. The surveillance method of claim 30 wherein the data attribute comprises luminosity.

33. The surveillance method of claim 30 wherein the data attribute comprises a biometric signature.

* * * * *